(12) United States Patent
Lu

(10) Patent No.: US 7,231,411 B1
(45) Date of Patent: Jun. 12, 2007

(54) REMOVABLE CARD SYSTEM WITH DOWNLOADABLE AGENT FOR COMMUNICATING WITH A DIGITAL TELEVISION RECEIVER OR OTHER HOST DEVICE

(75) Inventor: Jin Lu, W. Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/396,565

(22) Filed: Sep. 15, 1999

(51) Int. Cl.
*G06F 17/30* (2006.01)
*G06F 15/16* (2006.01)

(52) U.S. Cl. .................. 707/204; 707/104.1; 707/202; 709/223

(58) Field of Classification Search ................ 713/185, 713/201, 187; 380/227, 246, 203, 47; 705/51, 705/80, 57, 54; 709/219; 348/473; 707/1, 707/505; 235/380; 703/27
See application file for complete search history.

(56) References Cited

U.S. PATENT DOCUMENTS

| | | | |
|---|---|---|---|
| 4,709,137 A | 11/1987 | Yoshida | 705/41 |
| 5,349,649 A | 9/1994 | Iijima | 709/228 |
| 5,367,150 A | 11/1994 | Kitta et al. | 235/380 |
| 5,581,708 A | 12/1996 | Iijima | 710/11 |
| 5,588,146 A | 12/1996 | Leroux | 707/1 |
| 5,636,357 A | 6/1997 | Weiner | 711/115 |
| 5,739,510 A | 4/1998 | Petit | 235/380 |
| 5,764,934 A | 6/1998 | Fisch et al. | 710/306 |
| 5,798,507 A * | 8/1998 | Kawagishi et al. | 235/380 |
| 5,799,171 A * | 8/1998 | Kondou | 703/27 |
| 5,835,864 A | 11/1998 | Diehl et al. | 725/140 |
| 5,844,218 A | 12/1998 | Kawan et al. | 235/380 |
| 5,896,513 A | 4/1999 | Fisch et al. | 710/107 |
| 5,949,492 A * | 9/1999 | Mankovitz | 348/473 |
| 6,044,382 A * | 3/2000 | Martino | 707/505 |
| 6,678,753 B1* | 1/2004 | Tanaka | 710/16 |
| 6,698,654 B1* | 3/2004 | Zuppicich | 235/380 |
| 2001/0024066 A1* | 9/2001 | Fu et al. | 307/116 |
| 2002/0002069 A1* | 1/2002 | Keronen et al. | 463/1 |
| 2003/0115293 A1* | 6/2003 | Fogg et al. | 709/219 |

FOREIGN PATENT DOCUMENTS

| | | |
|---|---|---|
| WO | WO9701147 | 1/1997 |
| WO | WO9705582 | 2/1997 |

* cited by examiner

*Primary Examiner*—Jeffrey Gaffin
*Assistant Examiner*—Hassan "Tony" Mahmoudi
(74) *Attorney, Agent, or Firm*—Larry Liberchuk

(57) ABSTRACT

A removable card is adapted for insertion into a corresponding receptacle of a host device, and includes a processor for running at least one application. An agent program is downloadable from the removable card to the host device. The agent program runs on a processor of the host device and controls communication between the application running on the processor of the removable card and at least one application running on the processor of the host device. A different agent program may be downloaded from the card to the host device for each of the applications running on the removable card processor, and each such agent program controls communications between its corresponding removable card application and one or more application programming interfaces (APIs) of applications running on the host device processor.

24 Claims, 3 Drawing Sheets

REMOVABLE CARD SYSTEM WITH DOWNLOADABLE AGENT FOR COMMUNICATING WITH A DIGITAL TELEVISION RECEIVER OR OTHER HOST DEVICE

BACKGROUND OF THE INVENTION

1. Field of the Invention

The present invention relates generally to digital television receivers and other types of host devices for processing video or other multimedia information, and more particularly to techniques for providing interaction between removable cards and such host devices.

2. Description of the Related Art

Communication between applications running on physically separate devices is becoming increasingly important as a result of ongoing development in areas such as end-to-end digital communication systems and Internet applications. Robust, flexible and simple inter-application communication mechanisms are desirable in that such mechanisms allow application developers to shorten the time-to-market of products. Examples of existing technologies that have been designed to support inter-application communication include Common Object Request Broker Architecture (CORBA), Distributed Component Object Modeland (DCOM), Java Remote Method Invocation (RMI), and the Sun Microsystems Java-based system known as JINI for networking home appliances, desktop computers and other types of consumer electronics. The particular technology selected will generally depend on factors such as the type of applications and system architecture involved.

One area in which inter-application communication is particularly important is in digital television (DTV) systems. The trend in such systems is to separate the DTV functions into two categories: (1) the standardized functions, such as MPEG-2 transport stream demultiplexing and decoding; and (2) proprietary and security-related functions, such as conditional access systems and proprietary applications. The standard functions can then be implemented on a DTV receiver host, and the proprietary and security-related functions can be implemented on a removable card that is inserted into and communicates with the host. The host and removable card interact to provide desired programs and/or services to consumers.

This type of card-host system architecture increases the reusability and extensibility of the DTV receiver. For example, a consumer is able to purchase a DTV receiver in the form of a set-top box that includes a set of standard features. If the consumer then wants to receive premium programs and/or services from a cable operator, the consumer can purchase or lease a removable card from the cable operator or other source. The removable card in this case contains all of the functions needed to allow the consumer to receive and decrypt the premium programs and/or services provided by the cable operator. In the event that the cable operator adopts new technologies or provides new programs and/or services, the operator can upgrade the removable card, e.g., through a software download or replacement. Alternatively, if the consumer chooses to subscribe to a different cable operator, the consumer can return the removable card to the original operator, and purchase or lease a removable card from the new operator. In any case, the investment of the consumer in the DTV receiver is protected without compromising the ability of the consumer to take advantage of new technologies, programs and/or services.

Another advantage of the above-described card-host system architecture is that it protects the intellectual property rights of content and service providers against hackers who may try to break the system and "steal" the premium programs and/or services. This is due to the fact that all of the proprietary and security-related functions are in a separate removable card that can be disabled and/or replaced if a hacking attempt is detected.

In order for the card-host system architecture to work properly, the host and the removable card must establish a communication channel and protocol. In conventional systems, the host and card typically communicate through message passing, based on a defined set of data descriptors and/or structures. For example, if a consumer wants to order a video on demand (VOD) service, he or she sends a request through a user interface to the host, and the host in response sends a "VOD requested" data descriptor to the removable card. In such an arrangement, the removable card may then respond by sending a data descriptor that contains the requested list of VODs with the information necessary for ordering.

There are a number of significant drawbacks to the conventional card-host communication described above. First, the data descriptors generally must be standardized, such that the hosts and removable cards, which are usually manufactured by different vendors, can understand each other. However, it is often very difficult to specify standardized "generic" data descriptors that will satisfy all of the venders, users and other involved parties. Even if such a descriptor is found that appears acceptable and complete at the time it is defined, as new business needs emerge, it may become necessary to add or to remove some items in an existing data descriptor or add a new data descriptor. In such situations, the parties involved are forced to either change an existing standard or do without the desired change. Another significant drawback is that the published details regarding data descriptors may reveal information regarding the inner structure of the removable card, or other information that could be used by hackers to break the system.

Other techniques have been developed for implementing card-host communications. For example, U.S. Pat. No. 5,588,146 describes a system in which a removable card stores software programs with rights of access. The software can be downloaded into a microcomputer after the card is inserted therein. U.S. Pat. No. 5,739,510 describes the interaction between a removable card and a "dumb" terminal that handles user interface operations including input and output. The card performs application-specific operations, and the results are then communicated with the terminal. Another known technique, described in U.S. Pat. No. 5,844,218, relates to a removable card that stores customized information for television receivers, such that different consumers can receive different services bases on the information stored on their cards.

Unfortunately, these and other known techniques have failed to provide an acceptable solution to the above-described problem of inter-application communication in a card-host architecture. A need therefore exists for improved techniques for implementing communications between a removable card and a host device in a DTV system or other system based on a card-host system architecture.

SUMMARY OF THE INVENTION

The invention provides improved communication between a removable card and a receiver or other host device in a system which is based on a card-host architecture.

In accordance with the invention, a removable card is adaptable for insertion into a corresponding receptacle of a host device, and includes a processor for running at least one application. An agent program is downloadable from the removable card to the host device, such that the agent program runs on a processor of the host device and controls communication between the application running on the processor of the removable card and at least one application running on the processor of the host device. A different agent program may be downloaded from the card to the host device for each of the applications running on the removable card processor, and each such agent program controls communications between its corresponding removable card application and one or more application programming interfaces (APIs) of applications running on the host device processor. As another example, a single agent program can be shared by more than one application running on the removable card. The host device may be, e.g., a digital television (DTV) receiver, and the application running on the processor of the removable card may be a processing operation, e.g., a decryption operation, for a transport stream received via a cable signal.

In accordance with another aspect of the invention, after insertion of the removable card into the receptacle of the host device, a command channel and a data channel are created between the removable card and the host device. The processor of the host device runs an agent manager program which receives a message from the application running on the processor of the removable card. The message identifies a particular agent program to be downloaded, and in response to the message the agent manager program downloads the agent program from a memory of the removable card via the data channel. The agent program, after being downloaded to the host device, sends a message to the application running on the processor of the removable card via the command channel. The message indicates that the agent program is ready to control communication between the application running on the processor of the removable card and the application running on the processor of the host device. A given application, prior to requesting a download of a particular agent program to the host device, may first query the agent manager program to determine if the particular agent program has already been downloaded by another application. If the particular agent program has already been downloaded, no further downloading is needed and the given application can share the agent program with the other application.

Advantageously, the invention allows a removable card and a host device to communicate without the problems associated with the above-described conventional card-host communication techniques. For example, the invention eliminates the need to standardize data descriptors and/or structures between the cards and the host. In addition, the details of the communication protocol carried out between the agents and the removable card may be private, i.e., known only to the card and its agents, such that significantly improved resistance to hackers is provided. Although particularly well suited for use in a DTV receiver, the invention can be applied to any system or device in which a removable card communicates with a host. These and other features and advantages of the present invention will become more apparent from the accompanying drawings and the following detailed description.

DETAILED DESCRIPTION IF THE INVENTION

Figure 1:
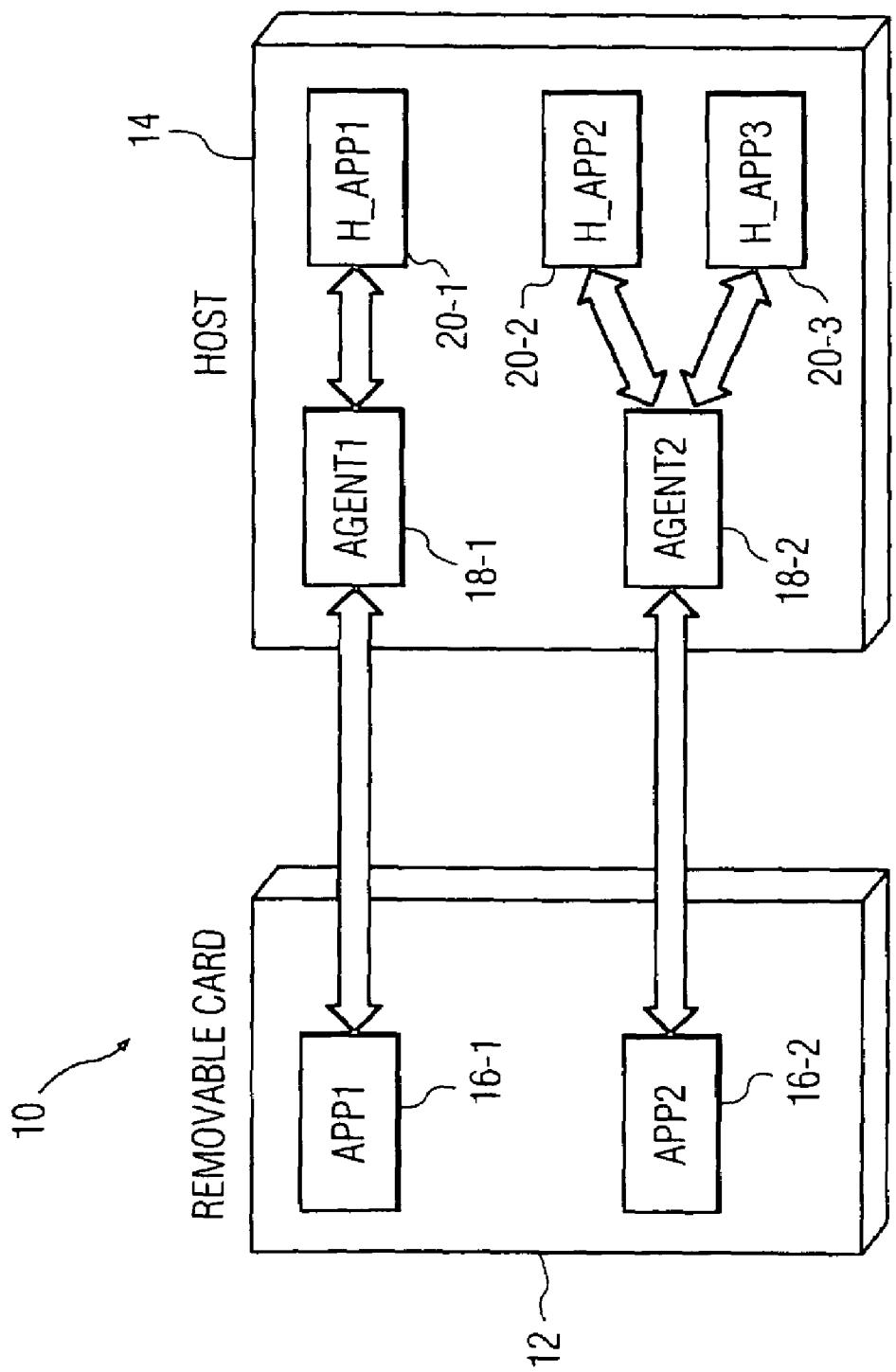
FIG. 1 is a block diagram illustrating communication between a removable card and a host in accordance with the invention.

FIG. 1 is a block diagram of an illustrative embodiment of a card-host system 10 in accordance with the invention. The system 10 includes a removable card 12 and a host 14. Applications 16-1 and 16-2, also denoted App1 and App2, respectively, are running on the removable card 12. In accordance with the invention, each of the applications 16-1 and 16-2 that need to communicate with the host 14 has a corresponding agent 18-1 and 18-2, respectively, that is deployed from the removable card 12 into the host 14. The agents 18-1 and 18-2 are also referred to herein as "smart" agents or removable agents. The card 12 and the host 14, although not requiring any specific physical configuration, each generally include a processor and a memory, and may include other types and arrangements of conventional processing elements. The term "card" as used herein is intended to include, e.g., memory cards, Personal Computer Memory Card International Association (PCMCIA) cards, or any other type of device adaptable for removable insertion into a corresponding receptacle of a host.

The agents 18-1 and 18-2 communicate with their corresponding applications 16-1 and 16-2 on the removable card, and also communicate with applications in the host 14. More particularly, agent 18-1 communicates with host application 20-1, also denoted H_App1, and agent 18-2 communicates with host applications 20-2 and 20-3, also denoted H_App2 and H_App3, respectively. Inter-application communication between the card applications and the host applications in the system 10 thus takes place through the agents 18-1 and 18-2.

In operation, when the removable card 12 is inserted into a corresponding slot or other suitable receptacle in the host 14, the communications between the card and host are initialized and established. The removable card 12 then downloads the agents 18-1 and 18-2 to the host 14 and verifies that the downloading is successful. The downloaded agents 18-1 and 18-2 then set up communication links between themselves and the respective applications 16-1 and 16-2 that they represent on the removable card 12. The applications 20-1, 20-2 and 20-3 on the host 14 and the applications 16-1 and 16-2 on the card 12 then begin to communicate through the agents 18-1 and 18-2.

The agents 18-1 and 18-2 are thus deployed into the host 14 from the card 12 after the card is inserted into the host, and may be viewed as proxies of their corresponding applications 16-1 and 16-2, respectively. The agents can use standardized application programming interfaces (APIs) of host components to communicate with the host applications 20-1, 20-2 and 20-3. The agents can be replaced, updated or removed by the removable card 12 as required to enhance existing applications or to implement new applications.

Advantageously, the system 10 of FIG. 1 eliminates the need to standardize data descriptors and/or structures between the cards and the host. In addition, the details of the communication protocol carried out between the agents and the removable card may be private, i.e., known only to the card and its agents, such that significantly improved resistance to hackers is provided. For example, the communications between the removable card and its agents on the host can be protected by encryption, with the encryption keys replaced as necessary. It is therefore apparent that use of downloadable smart agents to control card-host inter-application communication eliminates the above-described drawbacks associated with conventional card-host communication.

The system 10 of FIG. 1 may be viewed as implementing a client-server model between the host and the removable card, with the applications 20-1, 20-2 and 20-3 on the host 14 representing servers, and the agents 18-1 and 18-2 downloaded to the host from the removable card 12 representing the clients. The agents call the APIs of the servers to invoke services, such as displaying a certain message on a DTV monitor, retrieving remote control messages, etc. It is expected that these APIs in the DTV system context will be standardized, as indicated by the current practice of DTV-related standards bodies such as ATSC DASE, DAVIC, and Sun JavaTV. Once an API standard is finalized for DTV or other card-host system, any agent that is compliant with that standard will be able to interact with the applications of the host 14, and yet as previously noted there will be no need for the host vendors and the card vendors to agree on any particular standardized data descriptors and/or structures.

The downloading of the agents 18-1 and 18-2 from the card to the host may be implemented using a host-specific downloading mechanism. Alternatively, it may be desirable to utilize a standard card-host downloading mechanism, although it is believed that no such standard is currently available.

It should be noted that the particular number and arrangement of card applications, host applications and removable agents in the FIG. 1 system is by way of example only. The techniques of the invention may be implemented with other numbers and arrangements of applications and agents. For example, although the FIG. 1 system shows a separate agent associated with each of the applications 16-1 and 16-2 running on the removable card 12, in other embodiments one agent may be shared by more than one application running on the removable card.

Figure 2:
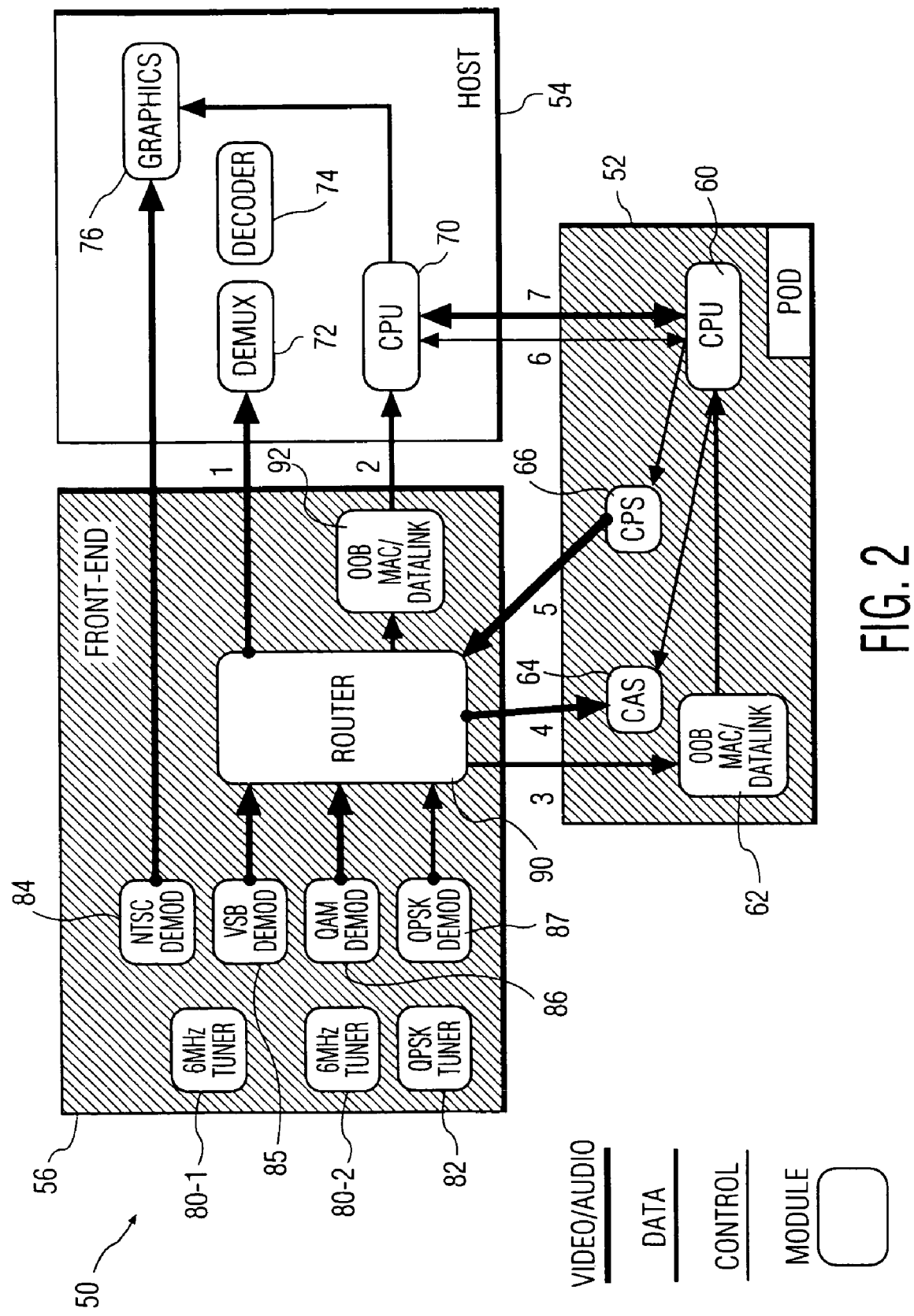
FIG. 2 shows a more detailed block diagram of an exemplary digital television (DTV) card-host system configured in accordance with the invention.

FIG. 2 shows a more detailed viewed of the card-host architecture of the present invention as implemented in a cable-ready DTV receiver 50. The receiver 50 may represent a set-top box, television, computer or other device, as well as portions or combinations of such devices. The receiver 50 in this implementation includes a removable card 52, a host 54 and a front end 56. The removable card 52 in this embodiment is more particularly referred to as a point of deployment (POD) 52, in accordance with the usual U.S. cable industry terminology for a removable card inserted into a set-top box, as described in OpenCable Set-top Terminal Functional Requirements, FR-OCS-WD01-990422.

The POD 52 includes a central processing unit (CPU) 60, a conditional access system (CAS) module 64, a copyright protection system (CPS) module 66, and an out-of-band (OOB) media access control (MAC)/Datalink module 62. The POD 52 is responsible for the following operations: (1) descrambling scrambled elementary streams in the incoming transport streams as received from the front end 56 via connection 4; (2) copy-protecting the descrambled streams before delivering them to the host via connection 5 and the front end 56; (3) processing downstream OOB signals as received from front end 56 via connection 3, in the OOB MAC/Datalink module 62; and (4) supporting applications.

The POD 52 in this embodiment of the invention may be viewed as a computer or other processing device with dedicated hardware. In this embodiment, it is assumed that the CPU 60 of POD 52 includes a memory that stores running application programs and buffers data. The CPU 70 of host 54 is also assumed to include such a memory. Communication between the CPU 60 in the POD 52 and the CPU 70 in the host 54 is through the control and data connections 6 and 7, respectively. Although not shown in FIG. 2, separate memory devices may be included in the POD 52 and host 54, external to their respective CPUs 60 and 70. Such memories may be used to store running applications, to buffer data, and to perform other functions.

In addition to the CPU 70, the host 54 further includes a transport stream demultiplexer 72, a decoder 741, and a graphics module 76. The host 54 is responsible for transport stream demultiplexing, video/audio/data decoding, graphics processing, and on-screen display. The functions and capabilities of the host 54 in this embodiment are thus shared by both terrestrial and cable signal processing operations.

The front end 56 includes both a terrestrial signal receiver and a cable signal receiver. The terrestrial signal receiver includes a 6 MHz tuner 80-1, a National Television System Committee (NTSC) demodulator 84, and a vestigial sideband (VSB) demodulator 85. The output of the NTSC demodulator 84 passes directly to the graphics module 76 of the host 54. The cable signal receiver includes a 6 MHz tuner 80-2, a Quadrature Phase-Shift Keyed (QPSK) tuner 82, a Quadrature Amplitude Modulation (QAM) demodulator 86, and a QPSK demodulator 87. The cable signal receiver receives and demodulates in-band QAM-modulated signals, and receives and demodulates out-of-band QPSK-modulated signals.

The outputs of the VSB demodulator 85, QAM demodulator 86 and QPSK demodulator 87 are supplied to a router 90 and can be delivered either to the POD 52 or the host 54. For example, the output of QAM demodulator 86 can go to the demultiplexer 72 on the host 54 via connection 1 or to the POD 52 via connection 4 depending on whether the POD 52 is inserted in its corresponding slot or other receptacle in the receiver 50. More particularly, if the POD 52 is not inserted, the output of the QAM demodulator 86 goes to the demultiplexer 72 on the host 54, and if the POD 52 is inserted, the output of the QAM demodulator 86 goes to the POD 52 through connection 4.

The output of QPSK demodulator 87 comprises in-phase (I) and quadrature (Q) bit streams. If the POD 52 is inserted, these bit streams are supplied to the POD 52 via connection 3 to be further processed for the purpose of execution of MAC/Datalink protocols. Although not shown in FIG. 2, a forward error correction (FEC) module may also be included in the POD 52 for processing the I and Q bitstreams from the QPSK demodulator 87. If the POD 52 is not inserted, the output of the QPSK demodulator 87 is ignored, or optionally goes to OOB MAC/Datalink module 92 in the front end 56. The output of the OOB MAC/Datalink module 92 is applied to the CPU 70 of host 54 via connection 2. The front end may also include the above-noted FEC module.

The router module 90 in the front end 56 routes the outputs of the QAM demodulator 86 and QPSK demodulator 87 to the proper destinations, depending on the insertion status of the POD 52. If the transport stream goes to the POD 52, it will come back from the POD 52, after being processed there, to be forwarded to the demultiplexer 72 on the host 54.

The applications in the POD 52 and host 54 communicate with each other through connections 6 and 7. Connection 6 is referred to herein as a command channel, and is used for transmitting control and configuration commands between the applications in the POD and host. Connection 7 is referred to herein as a data channel, and is used for sending data, such as a file or downloaded code.

Figure 3:
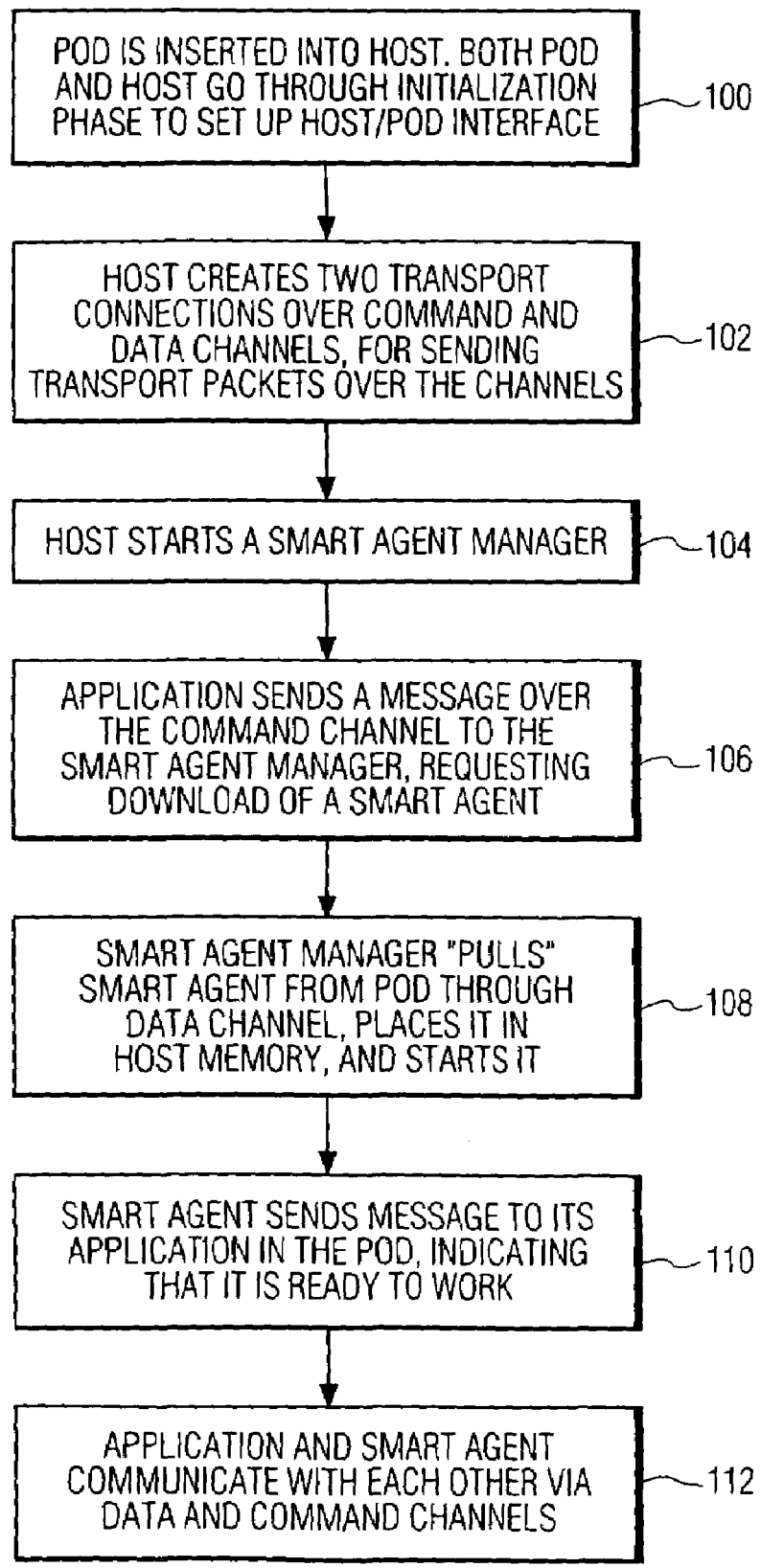
FIG. 3 is a flow diagram illustrating the operation of the exemplary DTV card-host system of FIG. 2.

FIG. 3 is a flow diagram illustrating in greater detail the interaction process between the POD 52 and the host 54 in setting up a smart agent in receiver 50 of FIG. 2. In step 100, the POD 52 is inserted into its corresponding slot or other receptacle in the host. After that, both the POD 52 and the host 54 go through an initialization phase to properly set up the host/POD interface. In step 102, the host 54 creates transport connections over the above-described command and data channels. The transport connections are used for sending transport packets over the channels. All control and command messages and data are sent in the transport packets.

In step 104, the host 54 starts a smart agent manager program. The smart agent manager program is responsible for downloading a smart agent at the request of an application in the POD 52. In step 106, an application running on the POD 52 sends a message over the command channel to the smart agent manager, requesting the smart agent manager to download a smart agent. The smart agent is then placed in a buffer in a memory of the POD 52. In step 108, the smart agent manager "pulls" the smart agent from its buffer in the POD 52 through the data channel, places it in a host memory and starts it. In step 110, the smart agent sends a message to its application in the POD 52, indicating that it is ready to operate. In step 112, the application in the POD 52 and the smart agent communicate with each other through the data channel and command channel.

The smart agent then interacts with one or more standardized application programming interfaces (APIs) for accessing services in the host. The smart agent uses these APIs to communicate with the applications on the host. Examples of such APIs include those defined for digital television services by the Data Application Software Environment (DASE) group of the Advanced Television System Committee (ATSC). It is expected that the DASE APIs will become standardized. A competing standard known as TVPAK, or Microsoft TV, also provides standardized APIs for accessing services in a DTV receiver.

Of course, the techniques of the present invention can be applied to many other types of APIs, and can also utilize other types of communication protocols for interacting with the applications running on the host 54.

As mentioned previously, the invention can be implemented such that one agent may be shared by more than one application running on the removable card. In such an embodiment, a given application running on the removable card, before requesting an agent download, queries the above-described agent manager program to see if the particular agent program it wants to use has already been downloaded to the host, e.g., by another application sharing the particular agent program. If the agent program is already in the host, no downloading is needed and the communication between the given application and the particular agent program can start. Otherwise, the agent program is downloaded in the manner described above.

As will be apparent to those skilled in the art, the smart agent and smart agent manager programs described herein can be generated in a straightforward manner, e.g., using conventional programming techniques. For example, the processing operations described in conjunction with the flow diagram of FIG. 3 may be programmed in a straightforward manner using, e.g., the well-known C programming language or other suitable programming language.

The embodiments of the invention described herein are intended for purposes of illustration only, and should not be construed as limiting the invention to any particular embodiment or group of embodiments. For example, although illustrated in FIG. 2 in conjunction with a DTV receiver, the invention can be used in many other card-host systems, including systems in applications such as satellite, cable or broadcast telephony or data delivery, computer communications networks such as the Internet, etc. Moreover, the particular arrangements of system elements shown herein are by way of example, and other embodiments could implement the invention using other types of devices, including desktop, laptop or palmtop computers, personal digital assistant (PDAs), televisions, set-top boxes, as well as portions or combinations of these and other devices.

It should also be noted that a removable card and its corresponding host in accordance with the invention can be implemented in any number of different arrangements. For example, the card itself need not have any particular size, shape or physical configuration. In addition, the invention may be implemented using other types and arrangements of CPUs, microprocessors, application specific integrated circuits (ASICs), as well as combinations or portions of these and other processors, in conjunction with many different types of memories, e.g., an electronic memory, an optical or magnetic disk-based memory or other storage device. Moreover, the invention can be implemented at least in part in the form of one or more software programs stored in a memory and executed by a processor. These and numerous other embodiments within the scope of the following claims will be apparent to those skilled in the art.

What is claimed is:

1. An apparatus for use with a host device having a receptacle, the apparatus comprising:

a removable card for insertion into the receptacle of the host device, the removable card including a first processor for running a first application, wherein an agent program is downloaded from the removable card to the host device that includes a second processor, such that the agent program runs on the second processor and controls communication between the first application and a second application running on the second processor, the second processor receiving a message from the first processor, the message identifying the agent program to be downloaded, and in response to the message the second processor downloading the agent program from the removable card via a data channel created between the removable card and the host device.

2. The apparatus of claim 1, wherein the first processor runs a plurality of applications, and a plurality of agent programs are downloaded to the host device, one for each of the applications running on the first processor.

3. The apparatus of claim 1, wherein the first processor runs a plurality of applications, and the agent program controls communication between two or more of the applications, at least one application running on the second processor.

4. The apparatus of claim 1, wherein the agent program interacts with an application programming interface (API) of the host device.

5. The apparatus of claim 1, wherein the agent program controls communication between the application running on the first processor and each of a plurality of applications running on the second processor.

6. The apparatus of claim 1, wherein communications between the agent program and the application running on the first processor are at least partially encrypted.

7. The apparatus of claim 1, wherein after insertion of the removable card into the receptacle, a command channel is created between the removable card and the host device.

8. The apparatus of claim 7, wherein the second processor runs an agent manager program for requesting a download of the agent program.

9. The apparatus of claim 8, wherein the agent program after being downloaded to the host device sends a message to the application running on the first processor, the message indicating that the agent program is ready to control communication between the application running on the first processor and the application running on the second processor.

10. The apparatus of claim 1, wherein the host device comprises a digital television receiver, and the application running on the first processor a processing operation for a transport stream.

11. The apparatus of claim 10 wherein the processing operation comprises a decryption operation.

12. A method for use with a host device having a receptacle, the method comprising the step of:
providing a removable card for insertion into the receptacle, the removable card including a first processor for running a first application, wherein an agent program is downloaded from the removable card to the host device that includes a second processor, such that the agent program runs on the second processor and controls communication between the first application and a second application running on the second processor, the second processor receiving a message from the first processor, the message identifying the agent program to be downloaded, and in response to the message the second processor downloading the agent program from the removable card via a data channel created between the removable card and the host device.

13. The method of claim 12, wherein the first processor runs a plurality of applications, and a plurality of agent programs are downloaded to the host device, one for each of the applications running on the first processor.

14. The method of claim 12, wherein the first processor runs a plurality of applications, and the agent program controls communication between two or more of the applications, at least one application running on the second processor.

15. The method of claim 12, wherein the agent program interacts with an application programming interface (API) of the host device.

16. The method of claim 12, wherein the agent program controls communication between the application running on the first processor and each of a plurality of applications running on the second processor.

17. The method of claim 12, wherein communications between the agent program and the application running on the first processor are at least partially encrypted.

18. The method of claim 12, wherein after insertion of the removable card into the receptacle, a command channel is created between the removable card and the host device.

19. The method of claim 18, wherein the second processor runs an agent manager program for requesting a download of the agent program.

20. The method of claim 19, wherein the agent program after being downloaded to the host device sends a message to the application running on the first processor, the message indicating that the agent program is ready to control communication between the application running on the first processor and the application running on the second processor.

21. The method of claim 12, wherein the host device comprises a digital television receiver, and the application running on the first processor includes a processing operation for a transport stream.

22. The method of claim 21 wherein the processing operation comprises a decryption operation.

23. An article of manufacture comprising a machine-readable storage medium containing one or more software programs which, when executed, cause:
downloading an agent program from a removable card for insertion into a receptacle of a host device, the removable card including a first processor for running a first application, such that the agent program runs on a host device processor and controls communication between the first application running on the first processor and the second application running on the host device processor, the host device processor receiving a message from the first processor, the message identifying the agent program to be downloaded, and in response to the message the host device processor downloading the agent program from the removable card via a data channel created between the removable card and the host device.

24. A system, comprising:
a removable card including a first processor for running a first application;
a host device having a receptacle for receiving the removable card, the host device including a second processor for running a second application, wherein an agent program is downloaded from the removable card to the host device, such that the agent program runs on the second processor and controls communication between the first application and the second application, the second processor receiving a message from the first processor, the message identifying the agent program to be downloaded, and in response to the message the second processor downloading the agent program from the removable card via a data channel created between the removable card and the host device.

* * * * *